(12) United States Patent
Stickney et al.

(10) Patent No.: US 8,708,373 B2
(45) Date of Patent: Apr. 29, 2014

(54) WAND FOR AN APPLIANCE

(75) Inventors: Timothy Nicholas Stickney, Malmesbury (GB); David Robert Sunderland, Malmesbury (GB); Marc Laurence Evans Gristwood, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 844 days.

(21) Appl. No.: 12/190,450

(22) Filed: Aug. 12, 2008

(65) Prior Publication Data

US 2009/0072528 A1 Mar. 19, 2009

(30) Foreign Application Priority Data

Aug. 21, 2007 (GB) .................................. 0716281.1

(51) Int. Cl.
*A47L 9/24* (2006.01)
(52) U.S. Cl.
USPC ............. 285/7; 285/145.1; 285/298; 285/302
(58) Field of Classification Search
USPC .......................... 285/7, 145.1, 298, 302–303; 403/109.1–109.3, 109.5, 109.7, 109.8
See application file for complete search history.

(56) References Cited

U.S. PATENT DOCUMENTS

| | | | |
|---|---|---|---|
| 2,941,822 A * | 6/1960 | Moecker ............................ | 285/7 |
| 3,083,041 A | 3/1963 | Owenmark | |
| 3,791,624 A * | 2/1974 | Payson ........................... | 254/212 |
| 5,462,311 A | 10/1995 | Cipolla | |
| 6,454,308 B1 | 9/2002 | Kim | |
| 6,854,486 B2 * | 2/2005 | Challender ................... | 138/109 |
| 7,159,270 B2 * | 1/2007 | Genoa et al. ..................... | 15/314 |
| 2002/0047264 A1 * | 4/2002 | Kim .................................. | 285/7 |
| 2004/0111828 A1 | 6/2004 | Evans | |
| 2007/0051404 A1 * | 3/2007 | Challender et al. .......... | 137/15.1 |

FOREIGN PATENT DOCUMENTS

| | | |
|---|---|---|
| DE | 3404204 | 8/1985 |
| EP | 0812564 | 12/1997 |
| EP | 0937435 | 8/1999 |
| EP | 0 998 871 A1 | 5/2000 |
| EP | 1 106 133 A1 | 6/2001 |
| EP | 1 380 247 A2 | 1/2004 |
| KR | 20-0253528 | 10/2001 |

OTHER PUBLICATIONS

International Search report and written opinion mailed on Dec. 12, 2008 directed at counterpart international application PCT/GB2008/002592; 12 pages.
GB Search Report, dated Nov. 20, 2007, directed to counterpart Application No. GB0716281.1; 1 page.

* cited by examiner

*Primary Examiner* — Aaron Dunwoody
*Assistant Examiner* — Fannie Kee
(74) *Attorney, Agent, or Firm* — Morrison & Foerster LLP

(57) ABSTRACT

A wand for an appliance includes first and second tubes and a support mechanism, in which the second tube slides telescopically within the first tube along a common axis. The first and second tubes are arranged to be selectively secured to one another in an extended position or to allow movement therebetween and the support mechanism is located between overlapping portions of the tubes. The support mechanism includes tapered portions arranged to provide support between the tubes at separate points along the common axis of the tubes. By supporting adjacent tubes at a plurality of points along the common axis, the tubes are held more firmly with respect to one another. One tapered portion is able to move with respect to the tubes along the common axis, which reduces play between the tubes.

15 Claims, 7 Drawing Sheets

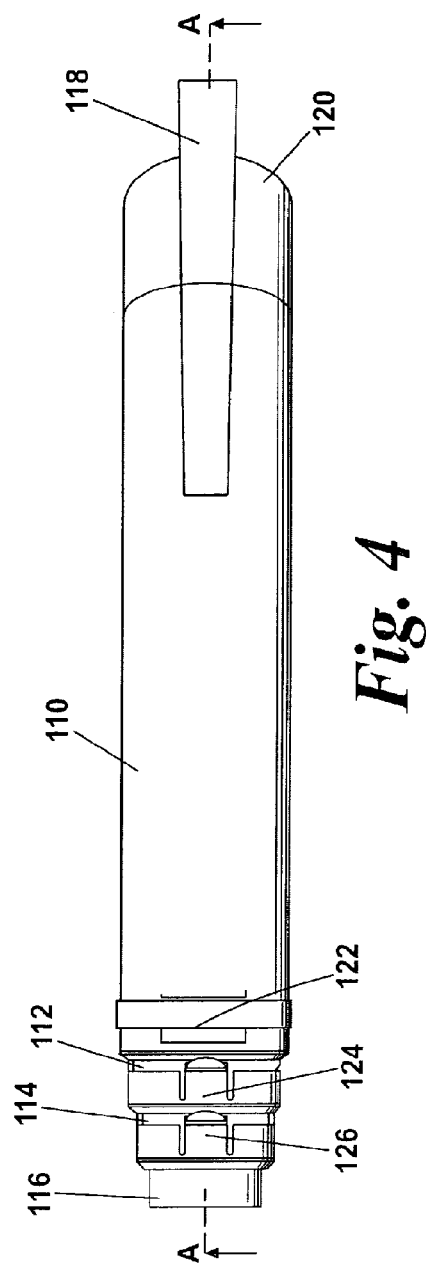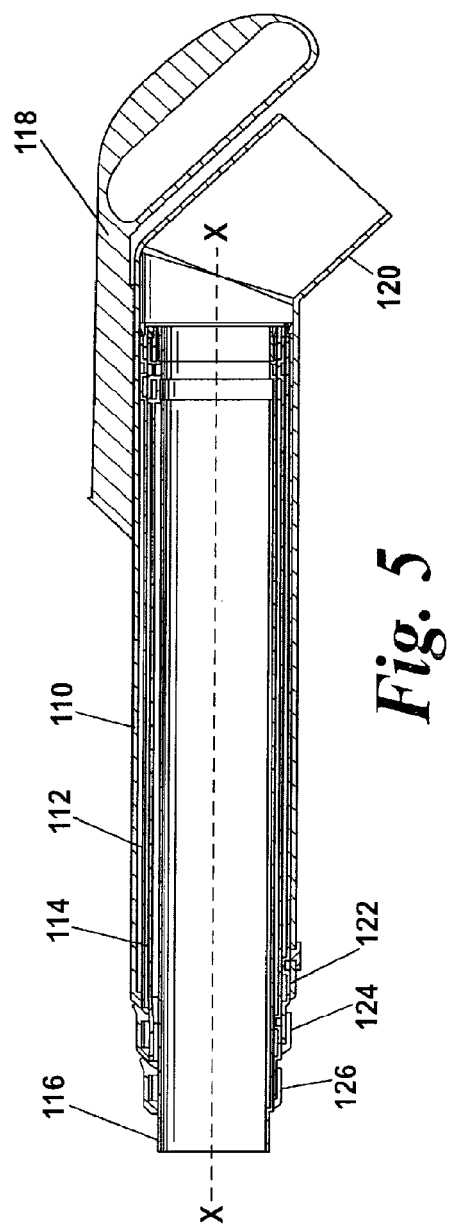

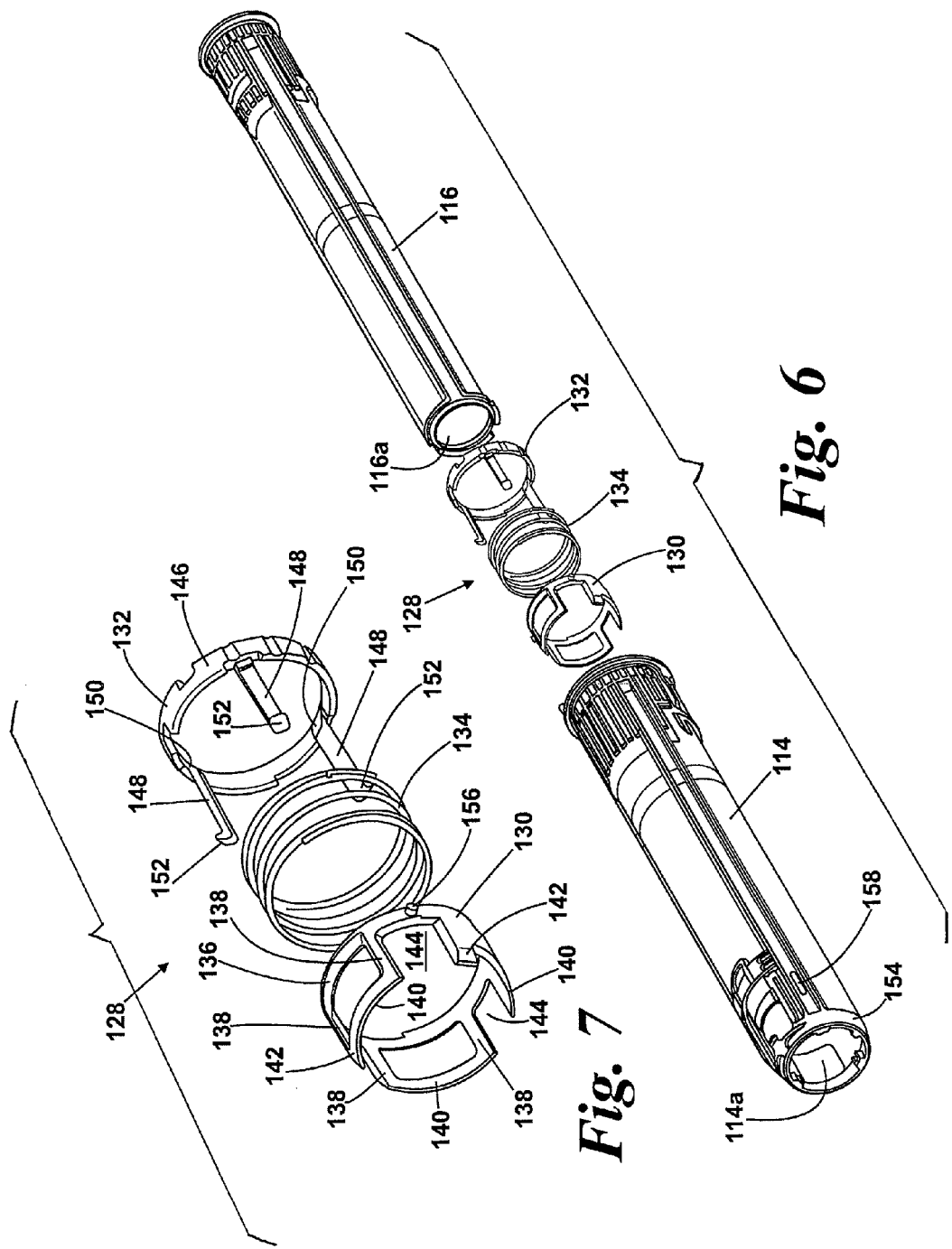

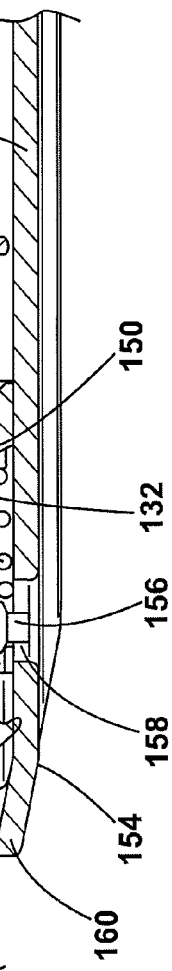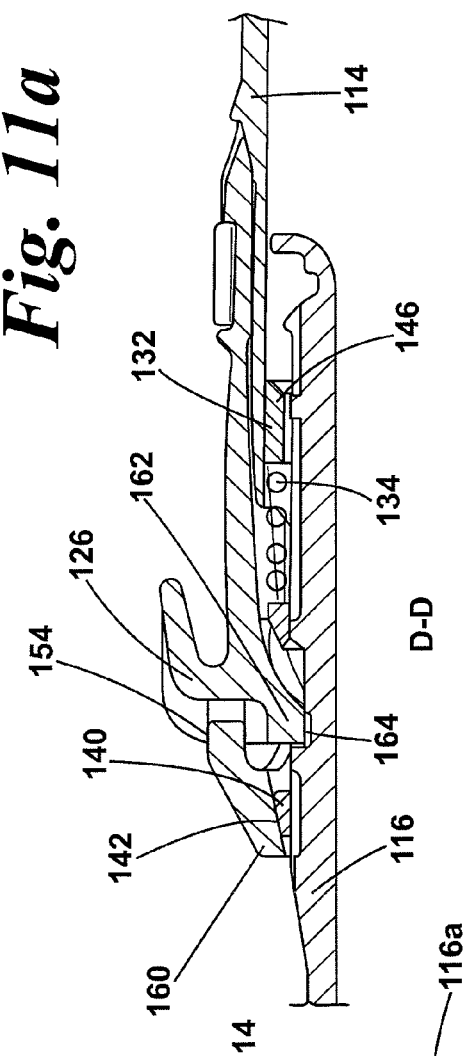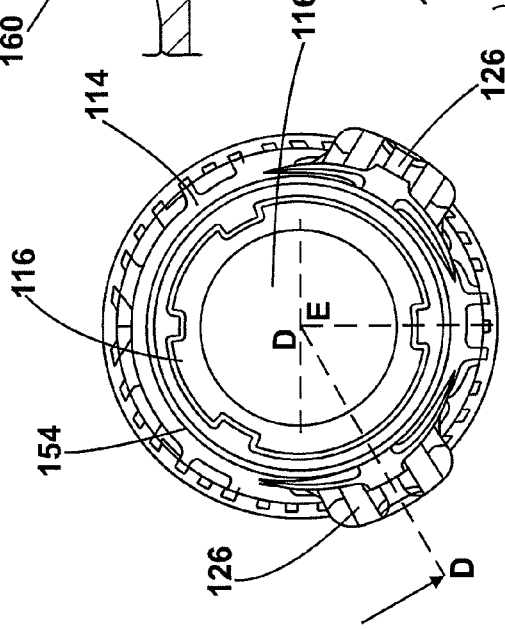

WAND FOR AN APPLIANCE

REFERENCE TO RELATED APPLICATIONS

This application claims the priority of United Kingdom Application No. 0716281.1, filed Aug 21, 2007.

FIELD OF THE INVENTION

The invention relates to a wand for an appliance such as a vacuum cleaner.

BACKGROUND OF THE INVENTION

Cylinder vacuum cleaners are well known and usually comprise a main body and a wand and hose assembly which is attached to the main body. The main body comprises a motor and fan unit for generating an airflow and separating apparatus for separating dirt and dust from the airflow. Commonly, the separating apparatus takes the form of a cyclonic separator or other separating media, such as a bag. The wand and hose assembly comprises a length of flexible hose which is attached to the main body of the vacuum cleaner at one end. A rigid wand is attached to the other end of the hose. The airflow enters the main body through the wand and hose assembly which is manipulated by a user to clean a floor surface.

A wand typically includes two hollow tubes which are telescopically connected to one another. An example of this type of wand is shown in U.S. Pat. No. 3,083,041. A first tube is rigidly connected to a handle and a second tube slides telescopically within the first tube. It is common to provide a form of releasable locking device to secure the two tubes in a fixed relationship with respect to one another so that the wand can be used to clean a surface. It is also common to provide a plurality of lockable positions so that the overall length of the wand can be adjusted to suit a particular user. Usually, the two tubes can be retracted inside one another for storage. This reduces the overall length of the wand for storage.

Whilst the above type of wand is simple to operate and to manufacture, a two tube arrangement cannot be reduced to a size below a half of its maximum extension. Therefore, such a wand is bulky and difficult to store. This type of wand also creates packaging problems for the manufacturer because the box in which the product is supplied has to be of a sufficient size to accommodate the bulky wand.

An alternative arrangement is shown in EP 1 380 247. In this arrangement, a wand assembly having four tubes is shown. The tubes are able to slide telescopically with respect to one another. The outermost tube carries a handle and acts as a storage tube into which the remaining three tubes slide telescopically. By providing four tubes, the wand assembly can have the same extended length as a two tube arrangement, but each tube can be correspondingly shorter than if only two tubes were provided. Therefore, when the tubes are telescopically retracted into one another, the overall length of the wand assembly is significantly reduced when compared to a two tube arrangement. This has benefits for storage and shipping purposes.

When multiple tubes are provided in a wand assembly, it is important to ensure that each tube fits securely against an adjacent tube with little or no play between the tubes when they are locked in extended positions relative to one another. Even if the connections between adjacent tubes only allow a small amount of play (or "wobble"), the amount of play is multiplied by the number of connections. In a four tube wand assembly, there are three connections. Therefore if each connection allows a few degrees of play between the respective tubes in any direction, then the wand will bend noticeably in use. This bending effect may reduce the structural stability of the wand assembly and the perceived quality of the wand assembly.

In some wand assemblies, this problem is addressed by manufacturing at least some of the telescopic tubes are from a metal, such as aluminium. The use of metal tubes means that the tubes can be manufactured to high tolerances, resulting in little or no play between tubes at connection points. However, aluminium is expensive to produce, and increases the weight of a wand assembly.

Known arrangements to secure two telescopically slideable tubes with respect to one another are shown in U.S. Pat. No. 3,083,041 and EP 1 106 133. In these arrangements, a wedge portion located on one of the tubes engages with a cooperating wedge portion on another tube. The interaction between the two wedges takes up any difference in the radial sizes of the tubes, securely holding the tubes with respect to one another. However, the arrangements shown in these documents are designed for use with a two tube system. This means that the central connector between the tubes can be large. A wand assembly having more than two tubes requires a smaller connector connecting each of the tubes; otherwise the tubes will not be able to slide inside one another in order to be stored.

It is desirable to have a compact and structurally sound wand assembly, in which the tubes forming part of the wand are held firmly with respect to one another even when the sizes of the tubes vary slightly as a result of the manufacturing process or other factors.

SUMMARY OF THE INVENTION

The invention provides a wand for an appliance comprising first and second tubes and a support mechanism, one of the first and second tubes being slideable telescopically within the other of the first and second tubes along a common axis, the first and second tubes being selectively securable to one another in an extended position or to allow free movement therebetween and the support mechanism being located between overlapping portions of the first and second tubes, wherein the support mechanism comprises first and second elements having respective tapered portions arranged to provide support between the first and second tubes at separate points along the common axis of the first and second tubes, one of the first and second elements being movable with respect to the first and second tubes along the common axis.

By supporting adjacent tubes at a plurality of discrete points along the common axis, the tubes are held more firmly with respect to one another, and play between the tubes is reduced. This improves the structural strength of the connection between the tubes, together with the perceived quality of the wand as a whole. The support mechanism comprises first and second elements, the first element having a first tapered portion and the second element having a second tapered portion. By providing two separate elements, greater support is achievable. The provision of a moving element further reduces play between the tubes.

Preferably, the movable element is slideably connected to one of the tubes and is moveable along the common axis relative to that tube between a first position and a second position.

Advantageously, both elements are movable along the common axis with respect to the first and second tubes. By providing such an arrangement, the two elements of the support mechanism are able substantially to eliminate any remaining play between tubes. Therefore, adjacent tubes can be securely held even if manufacturing tolerances or wear during use affect the relative dimensions of the tubes. The first and second elements are able to move to positions in which the first and second tubes are best supported.

Advantageously, the first and second elements are moveable with respect to one another along the common axis between a maximum and a minimum separation. At least one of the first and second elements may be restrained to prevent the maximum separation from being exceeded. This arrangement prevents the first and second elements from spreading too far apart, which may reduce the ability of the support mechanism to provide support between the two tubes.

Preferably, the first and second elements are resiliently biased with respect to one another. This may be achieved by means of a coil spring located between the first and second elements. Such an arrangement helps to bias the first and second elements into an optimum support position between the first and second tubes.

Each of the tapered portions may comprise a plurality of discrete wedge elements, disposed around the diameter of a tube. Four wedge elements give a strong and evenly spaced support between the tubes.

BRIEF DESCRIPTION OF THE DRAWINGS

An embodiment of the invention will now be described, by way of example, with reference to the accompanying drawings, in which:

FIG. 4 is a plan view of the wand of FIG. 3 showing the wand in a fully retracted position;

FIG. 5 is a side section of the wand of FIG. 3 taken along the line A-A of FIG. 4 showing the wand in the fully retracted position;

FIG. 6 is an exploded view of two telescopic tubes and a support mechanism forming part of the wand of FIG. 3;

FIG. 7 is an enlarged view of the support mechanism shown in FIG. 6;

FIG. 10 is a front view of the two tubes and support mechanism shown in FIG. 6 in an extended configuration;

FIG. 11a is a section taken along the lines D-D of FIG. 10 showing parts of the two tubes and the support mechanism;

FIG. 11b is a section taken along the lines E-E of FIG. 10 showing parts of the two tubes and the support mechanism.

DETAILED DESCRIPTION OF THE INVENTION

Figure 1:
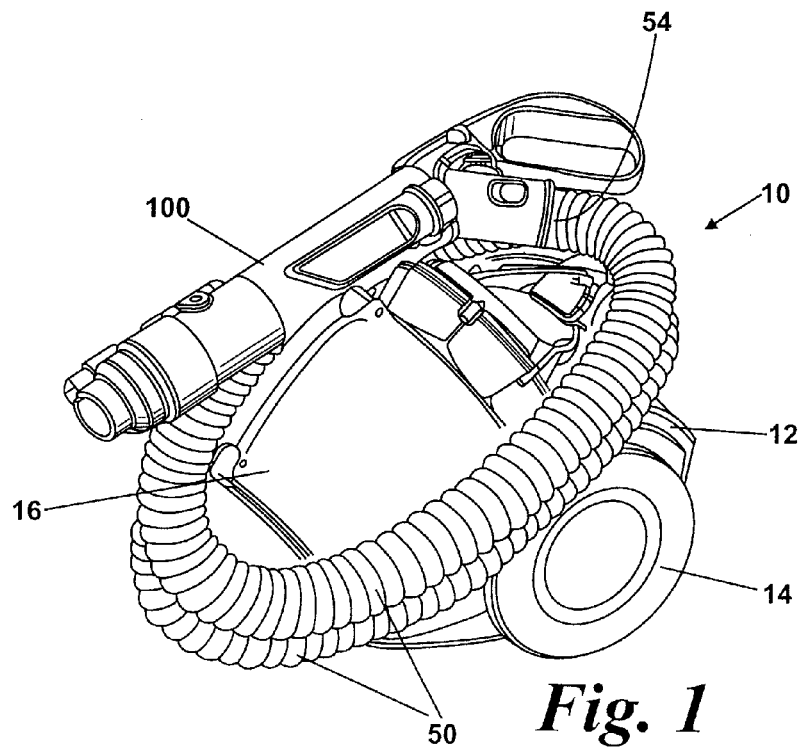
FIG. 1 is a perspective view of a cylinder vacuum cleaner incorporating a wand according to the invention and showing the wand stored on the vacuum cleaner in a fully retracted position.
Figure 2:
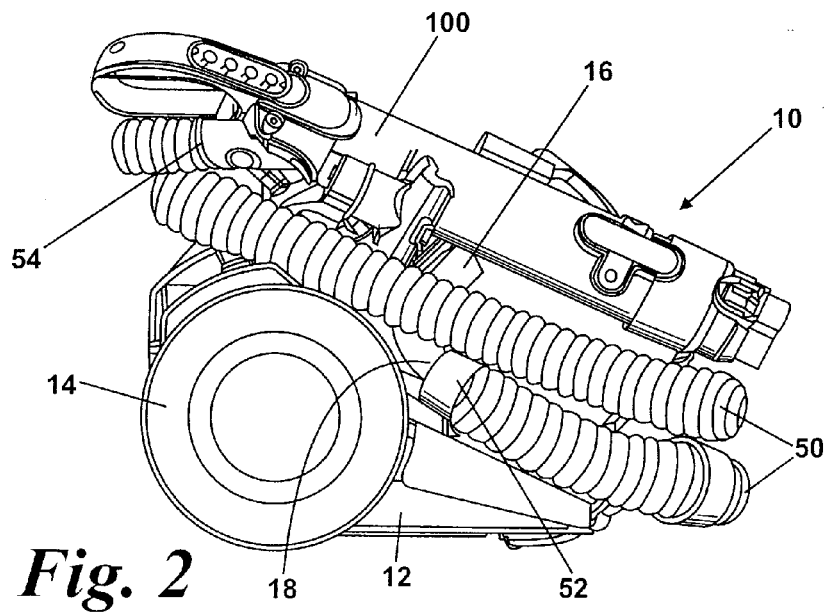
FIG. 2 is a side view of the cylinder vacuum cleaner of FIG. 1.

A vacuum cleaner incorporating a wand according to the invention is shown in FIGS. 1 and 2. The vacuum cleaner 10 has a main body 12 housing a motor and fan unit (not shown) and to which a pair of wheels 14 is attached. The wheels 14 allow the main body 12 of the vacuum cleaner 10 to be manoeuvred across a floor surface. Separating apparatus 16 is releasably attached to the main body 12. In this example, the separating apparatus 16 takes the form of a cyclonic separator. However, other arrangements, for example, a pleated filter or a bag, may be used. The nature of the separating apparatus 16 is not material to the invention.

The separating apparatus 16 has an inlet 18 through which a dirt-laden airflow enters the separating apparatus 16. A hose 50 is connected to the inlet 18 by a first connector 52, which is located at one end portion of the hose. The hose 50 also has a second connector 54 at an opposite end portion to the first connector 52. A wand 100 according to the invention is connected to the second connector 54. The wand 100 is shown in a stored position in FIG. 1. As shown in FIG. 1, the wand 100 and hose 50 are stored on the main body 12 of the vacuum cleaner 10. In this configuration, the vacuum cleaner 10 is compact and easy to store.

Figure 3:
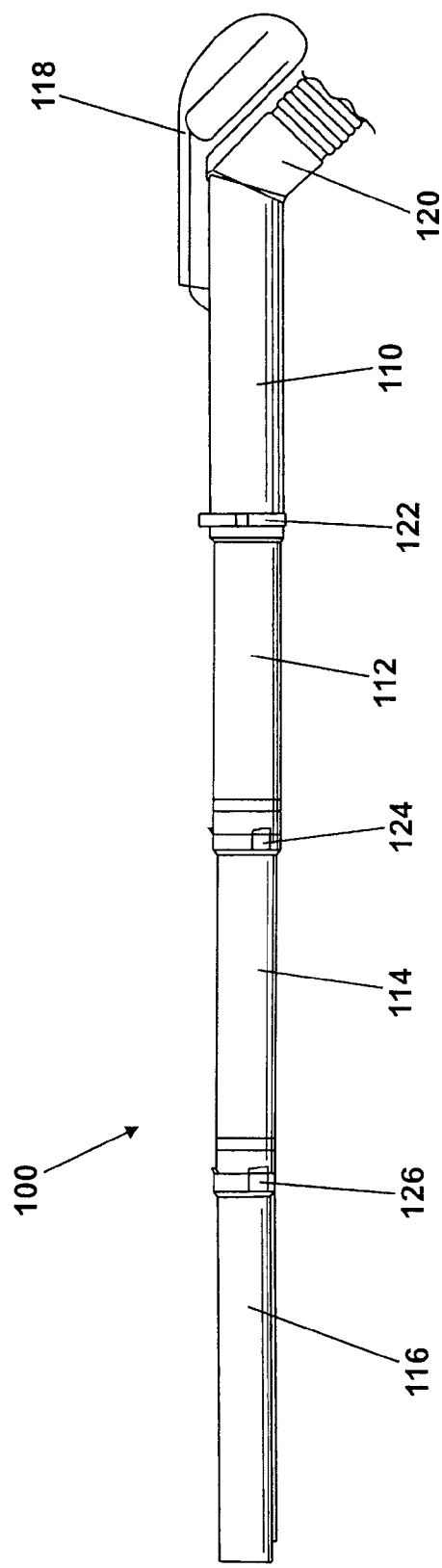
FIG. 3 is side view of the wand according to the invention removed from the vacuum cleaner of FIG. 1 and showing the wand in a fully extended configuration.

FIGS. 3 to 5 show the wand 100 in more detail. In FIGS. 3 to 5, the wand 100 is removed from the vacuum cleaner 10 for clarity. The wand 100 is movable between a fully extended position and a fully retracted position. FIG. 3 shows the wand 100 in a fully extended position. By this is meant that the wand 100 is extended to its maximum length. FIG. 4 is a plan view of the wand 100 in the fully retracted position. By this is meant that the wand 100 is retracted to its shortest possible length. FIG. 5 is a cross-section of the wand 100 taken along the line A-A of FIG. 4.

The wand 100 comprises four separate telescopic tubes 110, 112, 114, 116 which are slideable with respect to one another along a common axis X-X (FIG. 5). The tubes 110, 112, 114, 116 are hollow and progressively narrower in diameter so that they are able to slide within each other. The tubes 110, 112, 114, 116 are also progressively longer in length. The length of each tube 112, 114, 116 is chosen so that it fully occupies the available length of the outermost tube 110. The outermost tube 110 carries a handle 118 for grasping and manipulating the wand 100 in use. One end of the outermost tube 110 terminates in a wand connector 120 which connects to the second connector 54 on the hose 50. When connected to the vacuum cleaner 10, the hose 50 extends between the wand connector 120 and the inlet 18 of the vacuum cleaner 10.

Each tube 112, 114, 116 can be extended or retracted relative to an adjacent tube 110, 112, 114, 116 to move the wand 100 between the fully retracted position (as shown in FIGS. 4 and 5) and the fully extended position (as shown in FIG. 3). In the fully extended position, each tube 112, 114, 116 is extended relative to an adjacent tube 110, 112, 114 such that only the ends of the tubes 110, 112, 114, 116 overlap one another.

Connectors 122, 124, 126 are provided between adjacent tubes 110, 112, 114, 116. The connectors 122, 124, 126 are adapted and arranged to secure releasably overlapping portions of adjacent tubes 110, 112, 114, 116 to one another when a tube 112, 114, 116 is extended relative to a respective adjacent tube 110, 112, 114. An example of the type of connector 122, 124, 126 which could be used is illustrated in EP 1 380 247.

The connectors 122, 124, 126 are movable between locked and unlocked positions. In the locked position, the connectors 122, 124, 126 are capable of securing respective adjacent tubes 110, 112, 114, 116 to one another as is needed when the wand 100 is in the fully extended position shown in FIG. 3. Alternatively, in the unlocked position, the connectors 122, 124, 126 are capable of allowing free movement of the tubes 110, 112, 114, 116 with respect to one another, as is needed when the wand 100 is moved into the fully retracted position shown in FIGS. 4 and 5.

FIG. 6 shows an exploded view of the tubes 114 and 116. In the exploded view, the tube 116 is shown behind the tube 114. However, when assembled, the front end 116a of tube 116 will extend through the tube 114 and project forwardly from the open front end 114a of tube 114. A support mechanism 128 is located between overlapping portions of the tubes 114, 116. The support mechanism 128 comprises a first element 130, a second element 132 and a spring 134.

An enlarged view of the support mechanism 128 is shown in FIG. 7. The first element 130 comprises an annular frame 136, a plurality of connecting members 138 and a plurality of first tapered portions 140. The connecting members 138 extend forwardly from, and are spaced around the circumference of, the annular frame 136. In this embodiment, six connecting members 138 are provided. The first tapered portions 140 are located at the distal end of the connecting members 138 such that the connecting members 138 lie between the first tapered portions 140 and the annular frame 136.

The first tapered portions 140 comprise a plurality of wedge elements in the form of curved part-circular portions having a tapered outer surface 142 such that the thickness of each first tapered portion 140 increases from the front edge (furthest from the annular frame 136) to the rear edge (closest to the annular frame 136) of the first tapered portion 140. The first tapered portions 140 are circumferentially spaced by cut-outs 144. The first tapered portions 140 are arranged in this way to enable a degree of movement of the first tapered portions 140 in a radial direction (i.e. in a direction perpendicular to the common axis X-X shown in FIG. 5). This is to accommodate changes in diameter of the tube 114; for example, due to manufacturing tolerances. Further, the cut-outs 144 allow other components of the wand 100 (for example, locking or securing parts) to be fitted between the first tapered portions 140.

The second element 132 comprises an annular frame 146 and a plurality of locating fingers 148. The locating fingers 148 extend from the front edge of the annular frame 146 and project forwardly. In this embodiment, three locating fingers 148 are provided. The annular frame 146 has a plurality of wedge elements forming second tapered portions 150 located on the inner circumference of the annular frame 146 and at the proximal end of each locating finger 148. In this embodiment, three second tapered portions 150 are provided; each second tapered portion 150 corresponds to a locating finger 148. The second tapered portions 150 taper inwardly towards the front edge of the annular frame 146. By this is meant that the inner diameter of the annular frame 146 in the region of the second tapered portions 150 increases from the rear edge (furthest from the locating fingers 148) to the front edge (closest to the locating fingers 148) of the annular frame 146 adjacent the locating fingers 148.

A lug 152 is located at the distal end of each locating finger 148. The locating fingers 148 are adapted and arranged to project through the annular frame 136 of the first element 130 so that the first and second elements 130, 132 are able to slide with respect to one another along the length of the locating fingers 148 between a maximum and a minimum separation. The minimum separation occurs when the front face of the annular frame 146 abuts the rear face of the annular frame 136. The maximum separation is defined by the engagement of the lugs 152 with the front edge of the annular element 136.

The spring 134 is a coil spring which, when in position, is located between the first and second elements 130, 132. When located correctly, the spring 134 is surrounded by the locating fingers 148 and prevented from axial movement relative to the first and second elements 130, 132 by abutment with the rear face of the annular frame 136 and the front face of the annular frame 146. When held between the first and second elements 130, 132, the spring 134 is under compression such that the spring 134 is compressed to half of its natural length. In this configuration, the spring 134 biases the first and second elements 130, 132 away from each other. Therefore, in the absence of other forces acting on the spring, the spring 134 will hold the first and second elements 130, 132 at the maximum separation.

When located in position, the support mechanism 128 lies between the inner surface of tube 114 and the outer surface of the tube 116. The support mechanism 128 is located adjacent the front end 154 of the tube 114. The support mechanism 128 is held captive at the front end 154 of the tube 114 by engagement between a pip 156 located on the annular frame 136 and an aperture 158 formed in the tube 114. When correctly located, the pip 156 extends through the aperture 158, holding the support mechanism 128 captive. The aperture 158 is elongated to allow a small amount of movement of the pip 156 in the aperture 158. This allows the first element 130 of the support mechanism 128 to move a small distance relative to the tube 114 along the common axis X-X.

In use, a user starts with the vacuum cleaner 10 in the configuration shown in FIGS. 1 and 2. In order to ready the vacuum cleaner 10 for use, the user detaches the wand 100 from the main body 12 and unwraps the hose 50 from around the main body 12. In this situation, the wand 100 is in the fully retracted position as shown in FIGS. 4 and 5. The operation of the support mechanism 128 when the wand 100 is in the fully retracted position will now be described with reference to the tubes 114, 116 only.

Figure 9A:
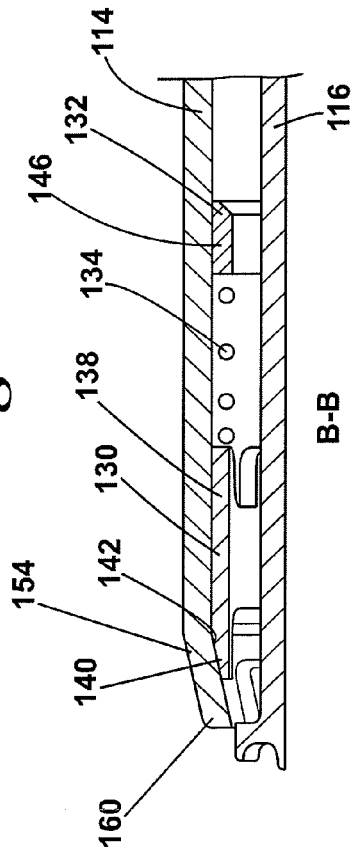
FIG. 9a is a section taken along the lines B-B of FIG. 8 showing parts of the two tubes and the support mechanism.
Figure 9B:
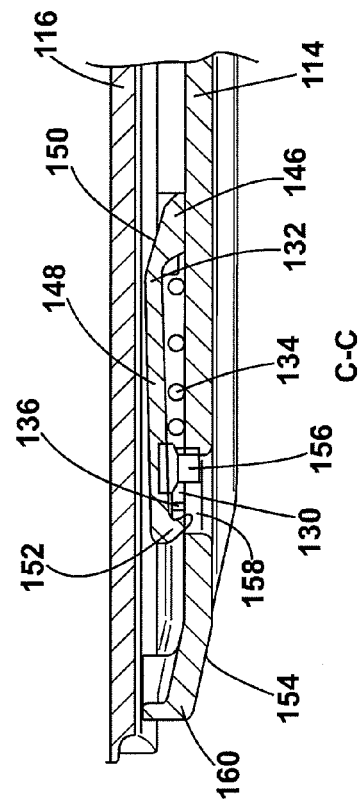
FIG. 9b is a section taken along the lines C-C of FIG. 8 showing parts of the two tubes and the support mechanism.
Figure 8:
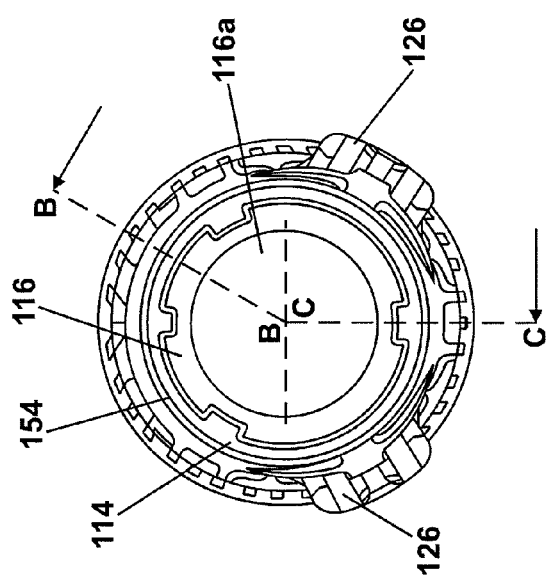
FIG. 8 is a front view of the two tubes; and the support mechanism shown in FIG. 6 in a retracted configuration.

FIGS. 8, 9a and 9b show the tubes 114, 116 in a retracted position with respect to one another. FIG. 8 shows a front view of tubes 114, 116. FIGS. 9a and 9b show a cross-section taken along the lines B-B and C-C of FIG. 8. FIG. 9a is the cross-section taken along the line B-B and FIG. 9b is the cross-section taken along the line C-C. Section C-C shows the pip 156 located in the aperture 158. This engagement holds the outer surface 142 of the first tapered portion 140 against an inwardly-tapered end portion 160 of the tube 114 (section B-B) and prevents the support mechanism 128 from sliding down the tube 114 along the common axis X-X. The arrangement of the first tapered portions 140 and cut-outs 144 allow flexibility in the radial direction. Therefore, the first tapered portions 140 are able to conform to the inner diameter of the tube 114 irrespective of small changes in the diameter due to manufacturing tolerances or other variables.

When the tubes 114, 116 are in the retracted position (so that the tube 116 lies almost entirely within the tube 114), the first and second elements 130, 132 sit at the maximum separation defined by the engagement of the lugs 152 with the front edge of the annular element 136. This can be seen in section C-C. In this state, the spring 134 is under approximately half compression.

In order to use the vacuum cleaner 10 to clean a floor surface, the user is required to move the wand 100 from the fully retracted position to the fully extended position. The fully extended position is shown in FIG. 3. In order to move the wand 100 into this position, the user first presses a release catch (not shown). This action unlocks the tubes 112, 114, 116 so that they can slide with respect to one another. The user then grasps the outermost tube 110 and the end of the innermost tube 116 and pulls the end of the innermost tube 116 away from the outermost tube 110. This action extends the innermost tube 116 until the innermost tube 116 reaches the end of its travel. The innermost tube 116 then engages with the next tube 114 to cause that tube 114 to be extended. This process repeats until the tubes 112, 114, 116 are all extended from the outermost tube 110. As each tube 112, 114, 116 reaches its maximum extension with respect to its adjacent tube 110, 112, 114, 116, the respective connector 122, 124, 126 locks the respective tube 112, 114, 116 to the respective adjacent tube 110, 112, 114, 116. The wand 100 is now in the fully extended position as shown in FIG. 3.

FIGS. 10, 11a and 11b show the tubes 114, 116 in an extended position with respect to one another. FIG. 10 shows a front view of tubes 114, 116. FIGS. 11a and 11b show a cross-section taken along the lines D-D and E-E of FIG. 10. FIG. 11a is the cross-section taken along the line D-D and FIG. 11b is the cross-section taken along the line E-E.

In the extended position, the tube 116 extends from the end portion 160 of the tube 114 and is locked in place by the connector 126. The connector 126, located on the tube 114, comprises a catch 162 which engages with a groove 164 located on the tube 116. The catch 162 can be released by engagement with the connector 124 located on the tube 112. This is so that the tubes 112, 114, 116 all collapse in order of the largest tube 112, 114, and 116 first. An arrangement to achieve this is described in EP 1 380 247.

As shown in section E-E in FIG. 11b, when the tubes 114, 116 are in the extended position a ramp portion 166 formed on the outer diameter of the tube 116 abuts the second tapered portion 150. The abutment between these two parts pushes the second element 132 axially towards the end portion 160 of the tube 114 and radially outwardly when the tube 116 is extended. However, the resilience of the spring 134 opposes this motion, causing the second element 132 to find an equilibrium position wherein the second element 132 provides support between the tubes 114, 116 with little or no play therebetween. In this position, the first and second elements 130, 132 are spaced at a distance between the minimum and maximum separations. This can be seen in section E-E of FIG. 11b, where the lug 152 is spaced from the front edge of the annular frame 136.

When the tube 116 is extended to lock in position relative to the tube 114, the compression of the spring 134 causes the first element 130 to move. This is because the first element 130 is held captive by the engagement between the pip 156 and the aperture 158 but is able to move a short distance. Therefore, the spring 134 exerts an equal but opposite force on both the first and second elements 130, 132. This force pushes the first element 130 towards the end portion 160 of the tube 114, causing the first tapered portions 140 to be forced between the inner diameter of the end portion 160 and the outer surface of the tube 116. The movement of the first element 130 is illustrated by the location of the pip 156 in the centre of the aperture 158; contrast this with the location of the pip 156 in FIG. 9b. Therefore, the first tapered portions 140 provide support between the tubes 114, 116 irrespective of the manufacturing tolerances on these parts.

Consequently, the first and second elements 130, 132 provide support between the two tubes 114, 116 at a plurality of axially-spaced and separate points along the axis of the tubes 114, 116. Therefore, when the wand 100 is in the fully extended position (as shown in FIG. 3), the tubes 110, 112, 114, 116 are locked with respect to one another and are held tightly, with little or no play between tubes 110, 112, 114, 116. This results in a wand 100 of greater structural strength and with a greater feeling of quality for the user.

Once the wand 100 is in the fully extended position, the wand 100 can be used to clean a surface. A floor tool or accessory may optionally be connected to the open end 116a of the wand 100. The user then switches the vacuum cleaner 10 on so that the motor and fan unit draws dirty air into the vacuum cleaner 10 through the open end 116a of the wand 100. The user manipulates the handle 118 to manoeuvre the wand 100 and hose 50 around a room. The main body 12 of the vacuum cleaner 10 can be dragged across the floor surface by the wand 100 and hose 50. The pair of wheels 14 attached to the main body 12 allows the main body 12 to be moved easily across a floor surface in this manner.

The dirty air, carrying dirt and dust from the floor surface, is drawn through the wand 100 and hose 50 and into the separating apparatus 16 via the inlet 18. Dirt and dust is separated from the airflow by the separating apparatus 16 and retained therein. The cleaned air then passes from the separating apparatus 16, through a pre-motor filter (not shown), across the motor and fan unit for cooling and through a post-motor filter (not shown) before being ejected from the vacuum cleaner 10.

The above-described arrangement is particularly suited to tubes manufactured from plastic material. This is because plastics have manufacturing tolerances which means that the internal and external diameters of the tubes may vary considerably from batch to batch. The benefit of the above-described arrangement is that, irrespective of the manufacturing tolerances, the first and second elements 130, 132 are able to move along the axis of the tubes 110, 112, 114, 116 in order to compensate for different tube diameters. In other words, the first and second elements 130, 132 are each able to provide support between any two adjacent tubes 110, 112, 114, 116 irrespective of the manufacturing tolerances.

Figure 12:
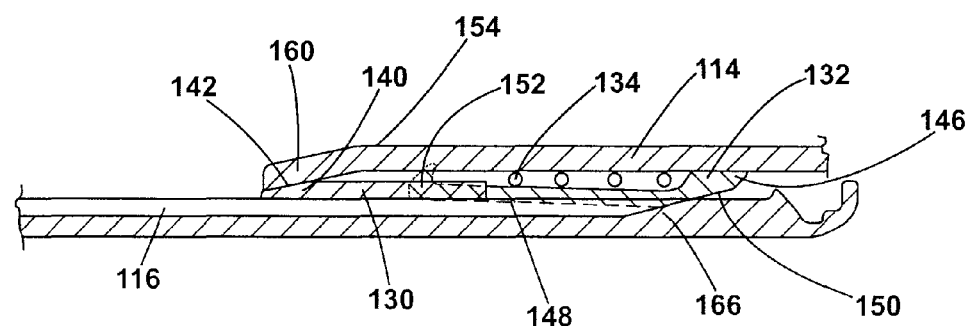
FIGS. 12 and 13 show cross-sections of a part of the two telescopic tubes and the support mechanism in two extreme cases of manufacturing tolerance variations.
Figure 13:
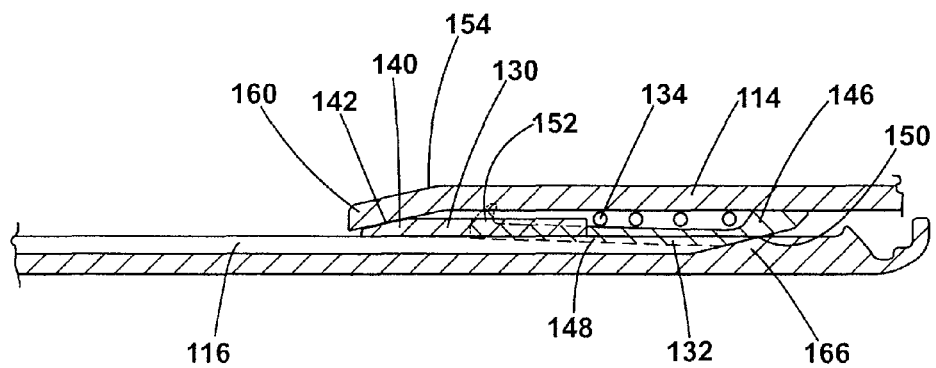

FIGS. 12 and 13 illustrate extremes in manufacturing tolerances. In FIG. 12, the larger tube 114 has a larger than normal internal diameter and the smaller tube 116 has a smaller than normal external diameter. Therefore, the spacing between overlapping portions of adjacent tubes 114, 116 is at a maximum. As shown in FIG. 12, the spring 134 pushes the first and second elements 130, 132 apart so that the first tapered portion 140 becomes wedged between the inner diameter of the end portion 160 of the tube 114 and the outer diameter of the tube 116. Thus, the first element 130 provides support between the tubes 114, 116.

The action of the spring 134 also pushes the second element 132 away from the tapered end portion 160. This forces the second tapered portion 150 between the inner surface of tube 114 and the ramp portion 166 on the outer surface of tube 116. Thus, the second element 132 provides support between the tubes 114, 116.

The opposite extreme is illustrated in FIG. 13. In this case, the larger tube 114 has a smaller than normal internal diameter and the smaller tube 116 has a larger than normal external diameter. Therefore, the spacing between overlapping portions of adjacent tubes 114, 116 is at a minimum. In this case, the first and second elements 130, 132 are pushed closer together than in the situation illustrated in FIG. 12.

The above situations illustrate that the above-described arrangement is able to compensate for variations in diameter between the tubes 114, 116 as manufactured. This is important because firm support between tubes 114, 116 is required otherwise the play between tubes 114, 116 will cause the tubes 114, 116 to move radially relative to one another. This reduces the perception of quality experienced by a user because the tubes 114, 116 will wiggle around and will not feel secure. The relative radial displacement of the tubes 114, 116 will appear to lack rigidity. The structural strength of the wand 100 may also be affected.

The above-described arrangement is suitable for use between any two adjacent tubes; for example, tubes 110, 112 and tubes 112, 114. It is envisaged that a support mechanism 128 will be provided between each pair of adjacent tubes 110, 112, 114, 116.

The invention is not limited to the detailed description given above. Variations will be apparent to the person skilled in the art. For example, further elements in addition to the first and second elements may be provided to give further support. In the above-described embodiment, both of the first and second elements 130, 132 move axially, but the wand could be arranged so that only one of the elements is moveable.

There need not be a plurality of wedge elements forming the first and second tapered portions. A single, continuous first tapered portion may be used, or a single continuous second tapered portion may be used. Alternatively, a number of wedge elements larger than the three or four illustrated above may be provided to form the tapered portions.

There need not be four separate tubes. A minimum of two tubes is required for the invention to function. However, any number of tubes greater than two may be used. Not all tubes need have support mechanisms between them; only some of the tubes need have support mechanisms.

Alternative locking mechanisms may be used other than the connectors described above. No connectors need be present; adjacent tubes may lock or secure to one another simply by way of an interference fit, friction fit or other arrangement such as a screw thread. Additionally, the tubes may have more positions than merely retracted and extended. Notches may be provided to allow the tubes to be locked in a number of different positions of extension with respect to adjacent tubes.

The handle need not be attached to the outermost tube of the wand. Whilst this is preferred, the handle may merely comprise a gripping portion on the outermost tube, or may be dispensed with entirely.

The appliance need not be a cylinder vacuum cleaner. The invention is applicable to other types of vacuum cleaner, for example, upright vacuum cleaners or stick-vacuums. Further, the present invention is applicable to other types of cleaning appliances, for example, a wet and dry machine or a carpet shampooer. The invention is also applicable to other appliances or devices, such as telescopic handles for mops or brushes which may be manufactured from plastic materials. Additionally, the invention is applicable to other devices such as telescopic arrangements for opening out-of-reach windows at a high level or walking devices for the elderly.

The invention claimed is:

1. A wand, for an appliance, comprising:
   first and second tubes; and
   a support mechanism,
   one of the first and second tubes being slideable telescopically within the other of the first and second tubes along a common axis,
   the first and second tubes being selectively securable to one another in an extended position or to allow movement therebetween, the support mechanism being located between overlapping portions of the first and second tubes,
   wherein the first tube comprises a first tapered end portion, the second tube comprises a second tapered end portion, and the support mechanism comprises a first element having a first tapered portion and a second element having a second tapered portion, the first and second tapered portions being axially spaced from one another along the common axis, the first tapered portion arranged to provide support between the first and second tubes by engagement with the first tapered end portion, the second tapered portion arranged to provide support between the first and second tubes by engagement with the second tapered end portion, and one of the first and second elements being movable with respect to the first and second tubes along the common axis.

2. The wand of claim 1, wherein the first and second elements are slideably connected to one of the tubes and are movable along the common axis relative to the tube between a first position and a second position.

3. The wand of claim 1 or 2, wherein the first and second elements are movable with respect to one another along the common axis.

4. The wand of claim 3, wherein the first and second elements are movable with respect to one another along the common axis between a maximum and a minimum separation.

5. The wand of claim 4, wherein the first and second elements are restrained to prevent the maximum separation from being exceeded.

6. The wand of claim 5, wherein one of the first and second elements carries at least one locating finger which engages with the other of the first and second elements to prevent the maximum separation from being exceeded.

7. The wand of claim 1 or 2, wherein the first and second elements are resiliently biased with respect to one another.

8. The wand of claim 7, wherein the first and second elements are resiliently biased by a coil spring located between the first and second elements.

9. The wand of claim 1 or 2, wherein the first tapered portion comprises a plurality of wedge elements in the form of part-circular portions having a tapered outer surface.

10. The wand of claim 1 or 2, wherein the second element includes a plurality of wedge elements that form the second tapered portion thereon.

11. The wand of claim 1 or 2, wherein at least one further tube is provided.

12. The wand of claim 11, wherein two further tubes are provided.

13. An appliance comprising the wand of claim 1 or 2.

14. The appliance of claim 13 comprising a cleaning appliance.

15. The appliance of claim 14 comprising a vacuum cleaner.

* * * * *